Feb. 3, 1931.  V. BENDIX ET AL  1,790,650
BRAKE
Filed Dec. 12, 1927

INVENTOR
VINCENT BENDIX
LUDGER E. LA BRIE
BY
M.W. McConkey
ATTORNEY

Patented Feb. 3, 1931

1,790,650

UNITED STATES PATENT OFFICE

VINCENT BENDIX, OF CHICAGO, ILLINOIS, AND LUDGER E. LA BRIE, OF SOUTH BEND, INDIANA, ASSIGNORS TO BENDIX BRAKE COMPANY, OF CHICAGO, ILLINOIS, A CORPORATION OF ILLINOIS

BRAKE

Application filed December 12, 1927. Serial No. 239,448.

This invention relates to brakes, and is illustrated as embodied in an internal expanding brake for an automobile. An object of the invention is to provide a simple and inexpensive brake which shall yet be very powerful, preferably by arranging a shoe or equivalent retarding member to bridge the gap usually left between the ends of the main friction device.
In one desirable arrangement, the shoe is applied by interengagement with one end of the main friction device, although if desired the applying means for the main friction device may also act through a novel thrust member on the auxiliary shoe. In the arrangement illustrated, the auxiliary shoe is wedged toward its applied position by engagement with a thrust member at the end of the main friction device, for example by forming wedge surfaces on spaced stiffening webs provided on the shoe and which straddle the end of the friction device in such a manner that these surfaces engage a thrust pin extending crosswise of that end.
In one very convenient arrangement, the friction device is of the type which anchors at one end when the drum is turning in one direction and at the other end when the drum is turning in the other direction, and the novel auxiliary shoe is pivoted to one of said ends and has wedging interengagement with the other of said ends.

The above and other objects and features of the invention, including various novel and desirable structural features, will be apparent from the following description of the illustrative embodiments shown in the accompanying drawing, in which.

Figure 1:
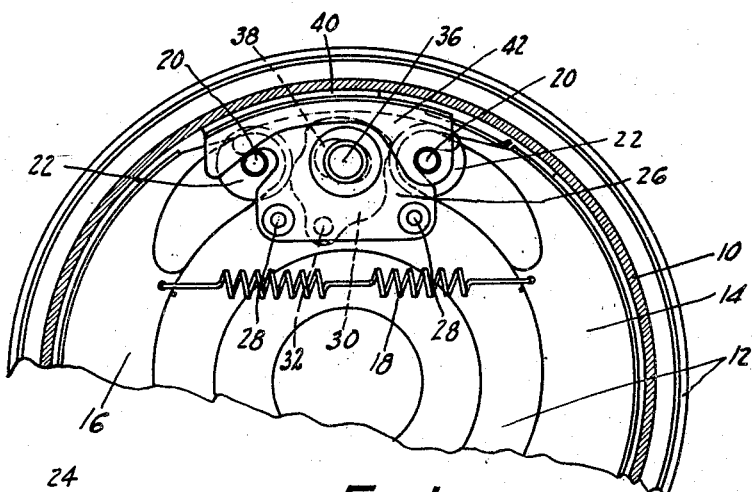
Figure 1 is a vertical section through the upper part of a brake embodying one form of the invention, and showing the brake shoes in side elevation.
Figure 3:
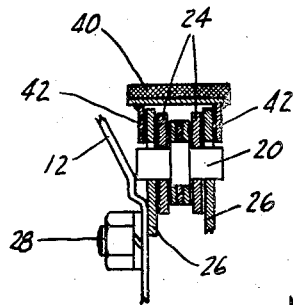
Figure 3 is a partial radial section through one of the brake anchorages, on the line 3—3 of Figure 2.

In both embodiments, the brake includes a rotatable drum 10, at the open side of which is a stationary support such as a backing plate 12, and within which is arranged the friction means of the brake.

The friction means preferably includes a main friction device, illustrated as including two pivotally-connected shoes 14 and 16 connected by a return spring 18, of the type anchoring at one end when the drum is turning in one direction and at the other end when the drum is turning in the other direction. The pivot connecting the shoes 14 and 16 at their lower ends, and which is not shown in the drawing, may if desired be substantially as fully described in Patent No. 1,634,368, granted Bendix Brake Company on July 5, 1927.

Figure 2:
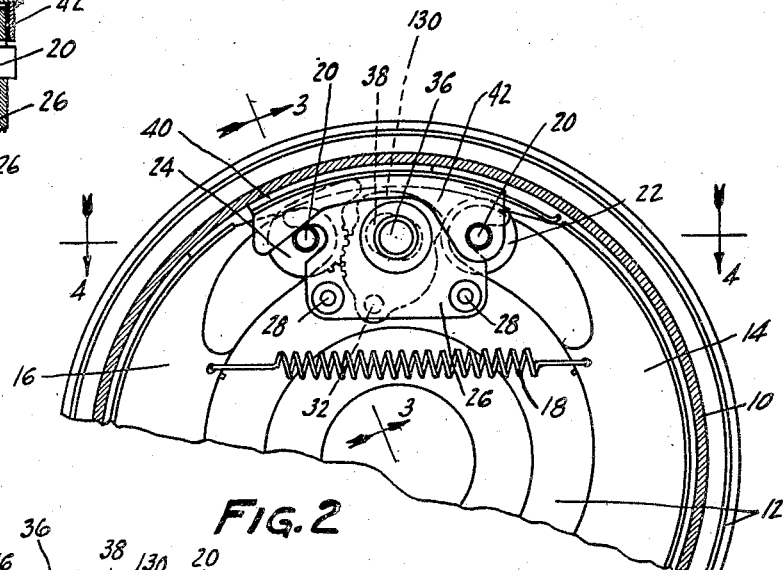
Figure 2 is a corresponding vertical section showing a somewhat different modification.
Figure 4:
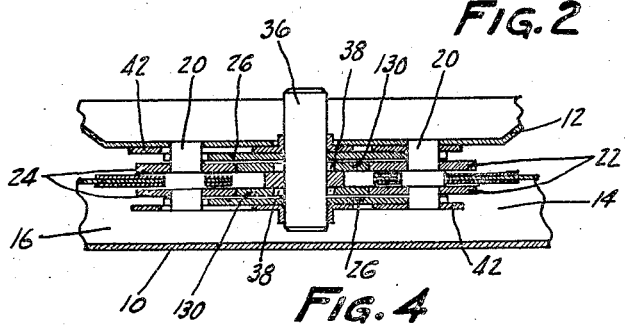
Figure 4 is a partial horizontal section on the line 4—4 of Figure 2.

At their upper ends, shoes 14 and 16 are provided with cross pivots, or equivalent thrust parts, 20 which may carry rollers 22 for both shoes, as shown in Figure 1, or rollers 22 for shoe 14 and novel eccentric thrust devices 24 for shoe 16 as shown in Figure 2. According to the direction of rotation of the drum when the brake is applied, one or the other of the pivots 20 anchors in notches formed in the opposite side edges of stationary plates 26 secured to backing plate 12 by posts or the like 28.

In the arrangement of Figure 1, the brake is applied by floating cams 30 connected by a pivot 32 to the end of an arm on a brake-applying shaft 36, which shaft may be journaled at its opposite ends in stamped bearings secured to plates 26. Shaft 36 passes through relatively large openings 38 in the cams 30.

According to an important feature of the present invention, between the separable ends of the main friction device 14—16 there is arranged a novel auxiliary brake shoe 40, preferably formed with spaced stiffening webs 42 straddling the ends of the friction device 14—16. Preferably shoe 40 is connected to the end of shoe 14 by being pivoted on its pin 20, and extends across the applying means 30, the opposite end interengaging with the end of shoe 14, for example by having wedge surfaces engaging the pin 20 of shoe 14.

It will be seen that the separation of the ends of the main friction device 14—16, and no matter which end remains anchored, will wedge the auxiliary shoe 40 outwardly against the drum.

The construction of Figure 2 is the same as that just described, except that cams 130 are formed on one side with teeth meshing with rack teeth formed on the novel eccentric devices 24, thus turning the devices 24 in a direction additionally to force shoe 40 toward the drum. If desired, in this case also the webs 42 may wedge against the pin 20 of shoe 16.

While two illustrative embodiments have been described in detail, it is not our intention to limit the scope of the invention to those particular embodiments, or otherwise than by the terms of the appended claims.

We claim:

1. A brake comprising, in combination, a drum, a main friction device engageable with the drum and anchoring at one end when the drum is turning in one direction and at the other end when the drum is turning in the other direction, and an auxiliary friction device forced against the drum by the main friction device.

2. A brake comprising, in combination, a drum, a main friction device engageable with the drum and anchoring at one end when the drum is turning in one direction and at the other end when the drum is turning in the other direction, and an auxiliary friction device forced against the drum by the main friction device in both directions of drum rotation.

3. A brake comprising, in combination, a drum, a shiftable main friction device engageable with the drum and having a transversely-extending part, and an auxiliary friction device having a wedge surface engaged by said part and forced against the drum by the shifting of the main friction device.

4. A brake comprising, in combination, a drum, two friction devices arranged generally end to end and engageable with the same zone of the drum surface, and an applying device acting on the end of one of the friction devices to force that friction device against the drum, said two friction devices having parts adjacent the applying device wedgingly interengaging with each other to force the other friction device against the drum.

5. A brake comprising, in combination, a drum, two friction devices engageable with the drum, and an applying device acting on the end of one of the friction devices to force that friction device against the drum, said two friction devices having parts wedgingly interengaging with each other adjacent said end to force the other friction device against the drum.

6. A brake comprising two brake shoes arranged end to end and having parts at their adjacent ends which so interengage that lengthwise movement of the one shoe applies the other shoe, in combination with applying means adjacent said ends for moving said one shoe lengthwise.

7. A brake comprising two brake shoes arranged end to end and having parts which so interengage that lengthwise movement of the one shoe applies the other shoe, in combination with applying means adjacent said parts for moving said one shoe lengthwise.

8. A brake comprising two brake shoes, one of which has a part wedging against a part of the other in such a manner as to wedge said other shoe toward its applied position, in combination with applying means acting on one of said shoes adjacent said parts.

9. A brake comprising two brake shoes, one having a wedge surface extending lengthwise of the shoe, and the other having a part operatively engaging said surface.

10. A brake comprising two brake shoes, one having a wedge surface extending lengthwise of the shoe, and the other having a thrust part extending crosswise and operatively engaging said surface.

11. A brake comprising one shoe having spaced stiffening webs formed with wedge surfaces, and the other projecting between said webs and having a part extending crosswise and operatively engaging said surfaces.

12. A brake comprising one shoe having spaced stiffening webs formed with wedge surfaces, and the other projecting between said webs and having a part extending crosswise and operatively engaging said surfaces, in combination with applying means acting on said crosswise-extending part.

13. A brake comprising one shoe having spaced stiffening webs formed with wedge surfaces, and the other projecting between said webs and having a part extending crosswise and operatively engaging said surfaces, in combination with a roller mounted on said crosswise-extending part, and a cam acting on said roller.

14. A brake comprising, in combination, a friction device having separable ends, and a shoe pivoted to one of said ends and operatively engaging the other of said ends.

15. A brake comprising, in combination, a friction device having separable ends, and a shoe pivoted to one of said ends, said shoe and the other of said ends having parts in wedging engagement.

16. A brake comprising, in combination, a friction device having separable ends, and a shoe pivoted to one of said ends and operatively engaging the other of said ends, together with applying means for forcing said ends apart.

17. A brake comprising, in combination, a friction device having separable ends, and a shoe pivoted to one of said ends, said shoe and the other of said ends having parts in wedging engagement, together with applying means for forcing said ends apart.

18. A brake comprising, in combination, a friction device having separable ends, said device being shiftable to anchor at either of said ends, and a shoe pivoted to one of said ends and operatively engaging the other of said ends.

19. A brake comprising, in combination, a friction device having separable ends, said device being shiftable to anchor at either of said ends, and a shoe pivoted to one of said ends and operatively engaging the other of said ends, together with applying means for forcing said ends apart.

20. A brake comprising, in combination, a shoe having an eccentric thrust part at its end, an applying device acting on said part to apply the shoe and concurrently turning said part, and another shoe engaged by said part and applied by the turning of said part.

21. A brake comprising, in combination, a shoe having an eccentric thrust part at its end formed with rack teeth, an applying cam acting on said part to apply the shoe and having teeth meshing with the teeth of said part to turn said part, and another shoe engaged by said part and applied by the turning of said part.

22. A brake comprising, in combination, a friction device having separable ends, a thrust part carried by one of said ends, and a brake shoe pivoted to the other of said ends and interengaging with said thrust part in such a manner as to be applied by the thrust part when the ends of the friction device are forced apart.

23. A brake comprising, in combination, a friction device having separable ends, a thrust part carried by one of said ends, and a brake shoe pivoted to the other of said ends and interengaging with said thrust part in such a manner as to be applied by the thrust part when the ends of the friction device are forced apart, together with applying means for forcing said ends apart and also acting to apply said shoe concurrently with the applying action of the thrust part.

24. A brake comprising, in combination, a drum, friction means having one part which anchors when the drum is turning in one direction and on another part when the drum is turning in the other direction, a servo shoe arranged to act on the friction means to force it against the drum, and applying means acting directly on the friction means and also acting on said servo shoe.

25. A brake comprising, in combination, friction means having adjacent separable ends, a servo shoe overlapping said ends, and applying means between and acting directly on said ends and also arranged to act on said shoe.

26. A brake comprising, in combination, friction means having adjacent separable ends, a servo shoe and applying means between and acting directly on said ends and also arranged to act on said shoe.

In testimony whereof, we have hereunto signed our names.

VINCENT BENDIX.
LUDGER E. LA BRIE.